United States Patent
Hemmen et al.

(10) Patent No.: US 12,303,841 B2
(45) Date of Patent: May 20, 2025

(54) GAS SEPARATION ARTICLE, A METHOD FOR PRODUCING SAID GAS SEPARATION ARTICLE AND USE THEREOF

(71) Applicant: CONDALIGN AS, Oslo (NO)

(72) Inventors: Henrik Hemmen, Oslo (NO); Linn Cecilie Sørvik, Oslo (NO); Luca Ansaloni, Oslo (NO); Thijs Andries Peters, Bekkestua (NO); Maria Teresa Guzman Gutierrez, Trondheim (NO); Liyuan Deng, Trondheim (NO)

(73) Assignee: CONDALIGN AS, Oslo (NO)

( * ) Notice: Subject to any disclaimer, the term of this patent is extended or adjusted under 35 U.S.C. 154(b) by 347 days.

(21) Appl. No.: 17/757,708

(22) PCT Filed: Dec. 18, 2020

(86) PCT No.: PCT/EP2020/087237
§ 371 (c)(1),
(2) Date: Jun. 17, 2022

(87) PCT Pub. No.: WO2021/123319
PCT Pub. Date: Jun. 24, 2021

(65) Prior Publication Data
US 2023/0026781 A1 Jan. 26, 2023

(30) Foreign Application Priority Data
Dec. 19, 2019 (NO) .................................... 20191496

(51) Int. Cl.
*B01D 53/22* (2006.01)
*B01D 67/00* (2006.01)
(Continued)

(52) U.S. Cl.
CPC ....... *B01D 71/0212* (2022.08); *B01D 53/228* (2013.01); *B01D 67/00791* (2022.08);
(Continued)

(58) Field of Classification Search
CPC .. B01D 69/107; B01D 53/228; B01D 53/222; B01D 53/221; B01D 53/223;
(Continued)

(56) References Cited

U.S. PATENT DOCUMENTS

2005/0238937 A1 10/2005 Oren et al.
2007/0022877 A1 2/2007 Marand et al.
(Continued)

FOREIGN PATENT DOCUMENTS

EP 2722916 A1 4/2014
WO WO-0197950 A1 * 12/2001 ......... B01D 67/0018
(Continued)

OTHER PUBLICATIONS

Cui, Yanbin et al.; Gas barrier performance of graphene/polymer nanocomposites; Carbon vol. 98, Mar. 2016, pp. 313-333.
(Continued)

*Primary Examiner* — Frank M Lawrence, Jr.
(74) *Attorney, Agent, or Firm* — Heslin Rothenberg Farley & Mesiti P.C.; George S. Blasiak, Esq.

(57) ABSTRACT

The disclosure provides a method for producing a gas separation article, said gas separation article comprising: a gas separation membrane, optionally a support, and optionally an additional support. The disclosure also provides a gas
(Continued)

separation membrane obtainable by the aforementioned method as well as use thereof for separation of gases in a gas mixture.

25 Claims, 5 Drawing Sheets

(51) Int. Cl.
    *B01D 69/10*     (2006.01)
    *B01D 69/14*     (2006.01)
    *B01D 71/02*     (2006.01)
    *B01D 71/54*     (2006.01)
    *C10L 3/10*     (2006.01)

(52) U.S. Cl.
    CPC ..... *B01D 67/00793* (2022.08); *B01D 69/107* (2022.08); *B01D 69/148* (2013.01); *B01D 71/0211* (2022.08); *B01D 71/54* (2013.01); *C10L 3/103* (2013.01); *C10L 3/104* (2013.01); *B01D 2323/35* (2013.01); *C10L 2290/548* (2013.01)

(58) Field of Classification Search
    CPC .. B01D 53/224; B01D 69/14; B01D 2256/16; B01D 2256/12; B01D 2256/18; B01D 2256/245; B01D 2257/102; B01D 2257/304; B01D 2257/504; B01D 2323/30; B01D 71/06–82; B01D 2323/35; B01D 53/22; B01D 67/00; B01D 67/0002; B01D 67/0006; B01D 67/0009; B01D 67/00091; Y02C 20/40
    USPC .............. 96/4, 7–14; 95/43, 45–55
    See application file for complete search history.

(56) References Cited

U.S. PATENT DOCUMENTS

| | | |
|---|---|---|
| 2009/0126567 A1 | 5/2009 | Liu et al. |
| 2011/0220574 A1 | 9/2011 | Bakajin et al. |
| 2012/0116024 A1* | 5/2012 | Lyoda ................... B01D 71/80 |
| | | 525/299 |
| 2021/0129084 A1* | 5/2021 | Abetz ................... B01D 71/80 |

FOREIGN PATENT DOCUMENTS

| | | |
|---|---|---|
| WO | WO 2004/005380 A1 | 1/2004 |
| WO | WO 2011/113117 A1 | 9/2011 |

OTHER PUBLICATIONS

Kumar, Sumit et al.; Enhancement of hydrogen gas permeability in electrically aligned MWCNG-PMMA composite membranes; Micron, vol. 41, Issue 7, Oct. 2010; pp. 909-914.

Lu, Lianyu, et al.; Novel graphite-filled PVA/CS hybrid membrane for pervaporation of benzene/cyclohexane mixtures; Journal of Membrane Science, vol. 281, Sep. 2006; pp. 245-252.

Wang, Haiquan et al.; Preparation of polymer/oriented graphite nanosheet composite by electric field-inducement; Composites Science and Technology, vol. 68, Jan. 2008, pp. 238-243.

International Search Report and Written Opinion of the International Searching Authority; PCT/EP2020/087237; Applicant: Condalign AS; Filing Date Dec. 18, 2020; Mailing Date Mar. 17, 2021.

European Patent Office, Office Action, mailed Feb. 25, 2025. 4 pages.

* cited by examiner

GAS SEPARATION ARTICLE, A METHOD FOR PRODUCING SAID GAS SEPARATION ARTICLE AND USE THEREOF

CROSS REFERENCE TO RELATED APPLICATIONS

This application is a national stage filing under section 371 of International Application No. PCT/EP2020/087237 filed on Dec. 18, 2020, and published on Jun. 24, 2021 as WO2021/123319 A1, which claims priority to Norway application No. 20191496 filed on Dec. 19, 2019. The entire contents of WO2021/123319 A1 are hereby incorporated herein by reference.

TECHNICAL FIELD

The present disclosure relates to a method for producing a gas separation article allowing for separation of gases in a gas mixture. The present disclosure also relates to a method for producing the gas separation article as well as use of the gas separation article for separating gases in a gas mixture.

BACKGROUND

Membranes for separation of gases in a gas mixture, i.e. gas separation membranes, are based on the physical and/or chemical interaction of the gases in the gas mixture with the membrane material. A wide variety of gas separation membranes are known and the use thereof frequently depends on the specific design of the membrane. For instance, the choice of membrane material may impact the membrane performance in terms of permeability and selectivity for specific gases allowing some gases to pass through the membrane while others are prevented from passing through. Further, the membrane material may comprise pores and/or further components to provide a specific gas permeability.

Gas separation membranes are used in many diverse applications such as gas purification or recovery, air separation, natural gas sweetening, vapor recovery, separation of by-products, in oil and gas related industries etc. Membrane separation technologies are considered as energy-efficient and compact solutions compared to conventional absorption-desorption technologies.

Traditional polymeric membranes have increased the commercial market for separations such as $O_2/N_2$ and $CO_2/CH_4$. These gas separation membranes comprise a polymer or mixture of polymers as membrane material and have been found to be economically and technologically useful. This stems from the low cost of polymeric membranes, and their high ductility and processability. However, there is often a limit on their performance known as the Robeson limit implying that there is a trade-off between selectivity and permeability. Mixed matrix membranes, i.e. polymeric membranes with inorganic fillers, may have improved properties compared to pure polymer membranes.

US 2011/0220574 discloses a composition and methods for nanoporous membranes comprising single walled, double walled, or multi-walled carbon nanotubes embedded in a matrix material. Average pore size of the carbon nanotube can be 6 nm or less. These membranes are said to be a robust platform for the study of confined molecular transport, with applications in liquid and gas separations and chemical sensing including desalination, dialysis, and fabric formation. It is disclosed that the membranes may be used for gas separations.

US 2005/0238937 discloses a process for producing ion exchange membranes. A matrix material that comprises a polymeric component chosen from the group consisting of monomeric and oligomeric polymer precursors and cross-linkable polymers is provided. Ion cation or anion exchange particles, or proton or hydroxyl or ion conducting particles, or cation or anion exchange polymers, or proton or hydroxyl or ion conducting polymers are introduced in the matrix. The particles are mixed or the polymer is dissolved with the matrix. The resulting mixture is formed into membrane configuration.

However, the relatively low performance of commercial polymers and the sensitivity towards harsh process conditions of gas streams have demonstrated the need for development of new high-performance materials. There exists thus a need for gas separation membranes such as polymer based separation membranes allowing for good selectivity with respect to separation of gases in a gas mixture. Further, there exists a need for gas separation membranes allowing for separation such as improved separation of gases in a gas mixture which has not been provided by hitherto known techniques.

SUMMARY

It is an object of the present disclosure to provide a method for producing a gas separation article such as a gas separation membrane allowing for selectivity with respect to separation of gases in a gas mixture. Further, it is an object of the present disclosure to provide a gas separation article obtainable by the aforementioned method and/or to provide improved separation of gases in a gas mixture which has not been provided by hitherto known techniques.

This object is wholly or partly provided by a method for providing a gas separation article said gas separation article comprising:
  a gas separation membrane,
  optionally a support, and
  optionally an additional support
  said method comprising the steps of:
  a) providing a matrix comprising:
     a matrix material having a viscosity from 1 cP to 40000 cP, particles, said particles being free from functionalized carbon nanotubes, and optionally a solvent,
  b) contacting the matrix of step a) with a support comprising at least one side, said at least one side facing said matrix, thereby forming (i) a matrix side in contact with the support and (ii) a matrix side opposite the side in contact with the support,
  c) optionally contacting the matrix side opposite the side contacting the support with an additional support,
  d) subjecting said matrix being in contact with said support to one or more electric fields whereby the particles form particle groups in a plurality of substantially parallel planes, said particle groups in each of said plurality of substantially parallel planes being aligned substantially parallel with the one or more electric fields,
  e) fixating the matrix material so as to fixate the particle groups thereby forming a gas separation membrane, and
  f) optionally removing the support and/or the additional support.

There is also provided a gas separation article obtained or obtainable by the method for providing a gas separation article described herein.

Further, there is provided a use of a gas membrane as described herein or a gas separation article as described herein for separation of gases in a gas mixture comprising one of more of the following:
oxygen and nitrogen,
carbon dioxide and methane,
carbon dioxide and natural gas
carbon dioxide and biogas
carbon dioxide and nitrogen
hydrogen sulfide and methane,
hydrogen sulfide and natural gas
hydrogen sulfide and biogas,
helium and nitrogen,
hydrogen and methane,
helium and methane,
helium and hydrogen,
hydrogen and carbon dioxide,
helium and carbon dioxide,
nitrogen and methane,
hydrogen and nitrogen,
hydrogen and carbon monoxide.
propene and nitrogen,
ethylene and nitrogen,
ethylene and argon,
vapor and natural gas

DESCRIPTION

The present disclosure provides a method for producing a gas separation article, said gas separation article comprising:
a gas separation membrane,
optionally a support, and
optionally an additional support
said method comprising the steps of:
a) providing a matrix comprising:
a matrix material having a viscosity from 1 cP to 40000 cP, particles, said particles being free from functionalized carbon nanotubes, and optionally a solvent,
b) contacting the matrix of step a) with a support comprising at least one side, said at least one side facing said matrix, thereby forming (i) a matrix side in contact with the support and (ii) a matrix side opposite the side in contact with the support,
c) optionally contacting the matrix side opposite the side contacting the support with an additional support,
d) subjecting said matrix being in contact with said support to one or more electric fields whereby the particles form particle groups in a plurality of substantially parallel planes, said particle groups in each of said plurality of substantially parallel planes being aligned substantially parallel with the one or more electric fields,
e) fixating the matrix material so as to fixate the particle groups thereby forming a gas separation membrane, and
f) optionally removing the support and/or the additional support.

The particles described herein may be free from carbon nanotubes such as functionalized carbon nanotubes. Thus, the particles described herein may be particles that are not carbon nantotubes such as functionalized carbon nanotubes.

Further, the particles described herein may comprise or consist of particles that are free from pores and/or particles that comprise pores. For example, the particles may comprise or consist of particles that are free from pores. In a further example, the particles may comprise or consist of particles comprising pores. As used herein, the expression "pore" intends an opening or cavity such as an opening or cavity going through an article. The particle pores may have a pore anisotropy that is equal to or less than about 100:1. As used herein, pore anisotropy intends the ratio of the longest dimension to the shortest dimension of the pore.

Moreover, the particles described herein may comprise or consist of one or more materials. For example, the particles may comprise one or more of the following: carbon based particles such as graphene, graphene oxide optionally functionalized with amine group(s), reduced carbon oxide, porous graphene oxides, graphite, carbon nanotubes; framework based particles such as metal organic framework, zeolitic imidazolate framework, covalent organic frameworks, porous organic frameworks, layered covalent organic frameworks, metal-organic-framework-decorated graphene; clays or other inorganic particles such as silica, layered aluminophosphates, layered silicates, layered titanosilicates, phyllosilicates, molybdenum disulphide; organic particles such as cellulose nanofibers. In an example. the particles may comprise or consist of one or more of the following: graphene, graphene oxide optionally functionalized with amine group(s), metal organic framework, and/or zeolitic imidazolate framework, clay, silica, carbon nanotubes, covalent organic frameworks, porous organic frameworks. In a further example, the particles may comprise or consist of graphene oxide and/or metal-organic framework. In still a further example, the particles may comprise or consist of metal-organic framework, zeolitic imidazolate framework, clay, silica, organic framework such as metal-organic framework, zeolitic imidazolate framework and/or nickel oxide nanosheets.

The particles described herein may be polarizable, i.e. the particles may be able to form a dipole. For instance, the particle(s) may form dipole(s) when subjected to an electric field. Additionally or alternatively, the particle(s) may form quadrupoles, be permanent dipoles, or be charged. In an example, the particles are dielectric particles. Further, the particles may be one-dimensional particles, two-dimensional particles, three-dimensional particles or a mixture thereof. As used herein, one-dimensional particles are particles that have a length, a width and a thickness, said length being significantly larger than the width and thickness, for example 100 times larger or more. Examples of one-dimensional particles include nanotubes such as carbon nanotubes; nanowires such as silver nanowires; fibers such as graphite fibres, polymer fibres or cellulose fibers. As used herein, two-dimensional particles are particles that have a length, a width and a thickness, said thickness being significantly smaller than the width and length, for example 100 times smaller or less. Examples of two-dimensional particles include graphene, graphene oxide, porous graphene oxides, metal-organic-framework-decorated graphene, some graphites, molybdenum disulphide, layered aluminophosphates (AIPO), layered silicates, layered titanosilicates, phyllosilicates, layered covalent organic frameworks, metal organic frameworks, hexagonal boron nitride, nickel oxide nanosheets.

The particles described herein may be homogenous particles, i.e. a particle consists of a single material or material mixture. However, the particles may also be heterogenous particles, i.e. a particle consisting of several materials. For example, the heterogenous particles may have a core of one material, and a sheath of another material. The particles may also contain contaminants, moieties or functionalized groups that enhance performance, such as electrical conductivity, magnetism, or affinity to gases.

The particles described herein may comprise only one type of particles or be a mixture of different types of particles. The particles may be paramagnetic and/or ferromagnetic. The particles may be electrically conductive or electrically non-conductive.

The particle size, i.e. the largest linear dimension of the particles, may range from 0.1 to 500 micrometers or 0.3 to 500 micrometers, or from 0.5 to 200 micrometers or from 1 to 100 micrometers, or from 3 to 50 micrometers, or from 0.1 micrometers to 20 micrometers.

The concentration of the particles in the matrix may be above the percolation threshold. Alternatively, the concentration of the particles in the matrix may be less than the percolation threshold. For instance, the concentration of the particles may range from 0.001 to 20 vol %, or 0.01 to 5 vol %, or 0.01 to 2 vol %, or 0.1 to 1.5 vol % based on the total volume of the matrix comprising the particles.

For mixtures of particles in a matrix a "percolation threshold" is defined as the lowest concentration of particles necessary in a random system to achieve a long-range connected network of particles. Such a random system is nearly isotropic. In a system formed by a method according to the present disclosure the concentration of particles necessary for achieving long range connected network of particles in a predefined direction is not determined by the percolation threshold and the concentration can be lower. For practical reasons the concentration of particles is determined by the requirements on the particle structures, there usually being no reason to have excess amounts of particles not arranged into the desired structures.

The particle groups of the gas separation article described herein may be surrounded by the viscous material.

The one or more electric fields described herein may be substantially parallel to a plane in which the support extends. It will be appreciated that the expression "substantially parallel to a plane in which the support extends" intends that the electric field lines are parallel to a plane in which the support extends and/or that the electric field lines, such as 50% or more of the electric field lines, deviate by 10 degrees or less from a plane in which the support extends. Since the particle groups formed in a plurality of substantially parallel planes upon exposure to the one or more electric fields will be aligned substantially parallel with the one or more electric fields it follows that the particle groups formed in substantially parallel planes may be substantially parallel to a plane in which the support extends. Thus, the particle groups may be substantially parallel to a plane in which the support extends. In this document, this is referred to as in plane alignment (IPA). As a result, gases in a gas mixture may penetrate the gas separation article so that some gases penetrate easily through the matrix comprising the plurality of particle groups while other gases can only pass slowly or not at all through the matrix comprising the plurality of particle groups. Accordingly, the overall result is a selective gas penetration.

Alternatively, the one or more electric fields may be substantially perpendicular to a plane in which the support extends. It will be appreciated that the expression "substantially perpendicular to a plane in which the support extends" intends that the electric field lines are perpendicular to a plane in which the support extends and/or that the electric field lines, such as 50% or of the electric field lines, deviate by 10 degrees or less from a plane that is perpendicular to a plane which the support extends. Since the particle groups formed in a plurality of substantially parallel planes upon exposure to the one or more electric fields will be aligned substantially parallel with the one or more electric fields it follows that the particles groups formed in a plurality of substantially parallel planes may be perpendicular to a plane in which the support extends. Thus, the particle groups may be substantially perpendicular to a plane in which the support extends. In this document, this is referred to through plane alignment (TPA). For example, some or all of the plurality of particle groups extend from the matrix side contacting the support to the matrix side opposite the side contacting the support. As a result, some gases in a gas mixture may penetrate faster than others through the article. It is believed that this may be due to interaction between some gases and the plurality of particle groups that are perpendicular or substantially perpendicular to the plane in which the support extends thereby enhancing the penetration rate. For instance, the interaction may involve retention or enhanced penetration rate of one or more of the gases in a gas mixture. Thus, the overall result is a selective gas penetration.

Further, the particles of the particle groups may be aligned substantially parallel with the one or more electric fields. Thus, depending on the alignment of the one or more electric field lines the particles of the particle groups may be aligned substantially parallel or substantially perpendicular to a plane in which the support extends.

The one or more electric fields may be alternating electric field(s).

The support of the gas separation article described herein may be porous or free from pores. The gas separation article described herein may further comprise an additional support. The additional support may be porous or free from pores. The gas separation article comprising the support and additional support may be an intermediate article allowing for transporting the article so that the risk of damage is reduced. Alternatively, the gas separation article comprising the additional support may be used as a gas separation membrane. In the latter case, the additional support and the support may both be porous.

The support and/or the additional support may comprise one or more of the following materials: polyethylene terephthalate (PET), polysiloxanes, polydimethylsiloxane (PMDS), poly(1-trimethylsilyl-1-propyne) (PTMSP), polyacrylonitrile (PAN), perfluoropolymers, perfluoroethers (PTFE), polyvinylidene fluoride (PVDF), polyether sulfones (PES), polysulfones (PSU), polyimides (PI), polyetherimides (PEI), polyamides, polyamideimides, polycarbonates (PC), polyesters, polyether ether ketone (PEEK), polye (ethylene oxide) (PPO), polyacrylates, polymethacrylates, cellulose acetate, polyethylene (PE), polypropylene (PP) polytetrafluoroethylene (PTFE), polymethylpentene (PMP) and copolymers thereof.

The support and/or the porous additional support may also be a multilayer material that may consist of several layers that add functionality to the porous support. One of these layers may be an intermediate gutter layer that prevents infiltration of the viscous material into the pores of the porous support, or facilitates removal of the support. The intermediate gutter layer may comprise poly(dimethylsiloxane). The gutter layer may further preferably be a radiation curable material that consists of one or more of the following radiation curable groups: ethylenically unsaturated groups, (meth)acrylic groups, (meth)acrylate groups, (meth)acrylamide groups or epoxide groups (e.g. glycidyl and epoxycyclohexyl groups).

The gas separation article described herein may be a gas separation membrane. The gas membrane may comprise a porous support and/or a porous additional support. Alternatively, the gas separation membrane may be free from support and additional support.

The viscous material described herein may comprise one or more of the following: monomer, oligomer and/or polymers such as one or more of the following polymers: polyurethane, polyether block amide, polyimide, polydimethylsiloxane, polyethylene glycol, ethylene acrylic elastomer, perfluoropolymers, polymerized ionic liquids, polysulfone, polyamide, polyvinylamine, polyallylamine, polyethyleneimine, cyanoacrylates, rosin acrylates, ester acrylates, urethanes acrylates, silicone acrylates, amine acrylates, epoxy acrylates or polyepoxides. It will be appreciated that the monomers and/or oligomers and/or polymers may be polymerized into one or more of the aforementioned polymers.

The matrix material described herein may be a viscous material. As used herein, a viscous material intends a material that to some extent will resist movement of an object such as a particle through the matrix. For instance, the viscous material may have a viscosity of about 200 cP or more, such as about 1000 cP, 35000 cP or about 40000 cP. As an example, the viscous matrix may have a viscosity within the range of about from 1 cP to 40000 cP, such as from 200 cP to about 40000 cP. In this document, cP stands for centipoise. The viscosity may be the viscosity measured at room temperature, such as a temperature from about 20° C. to about ° C., and atmospheric pressure. The viscosity must not be too high so that a pump cannot pump it, and not too thin (low viscosity) to not leak from everywhere or not holding together as a coating.

The method described herein may involve mixing by e.g. stirring or vortexing the viscous material and particles optionally in the presence of a solvent and optionally using ultrasound to further aid the mixing. As a result, the particles are distributed within the matrix material such as evenly distributed within the matrix material. For instance, step a) of the method described herein may comprise mixing of the viscous material and the particles.

In an example, the particle alignments may form organized patterns such as being arranged in a repeating lattice, where many particles (a statistical non-negligible % of these) are contained in at least two families of parallel plans crossing each other at constant angle all over the volume of the matrix. This may be for example the case where the particles have been aligned perpendicularly to a plane into which the article described herein extends and the aligned particle chains are for example arranged in a honeycomb structure.

Further, step b) of the method described herein may involve casting such as knife casting, roll coating, dip coating, die coating and/or rotary screen coating. The one or more electric fields may be applied in different ways thereby affecting the distribution and/or alignment of the particle groups. For instance, an electric field may be generated by interdigitated electrodes and applied in e.g. proximity to the support such that the plurality of particle groups are oriented substantially parallel to a plane in which the support extends. For instance, the voltage of the interdigitated electrodes may be about 350 Volts and have a frequency of about 10 kHz. In a further example, an electric field may be generated in e.g. proximity to the support and the additional support or the matrix side opposite the side contacting the support such that the plurality of particle groups are oriented substantially perpendicular to a plane in which the support extends.

It will be appreciated that step d) of the method described herein may take place before or after steps b) and/or c).

The fixating of step e) may result in solidifying the viscous material whereby the particle groups are fixated. As a result the particles are immobilized and particle movement or drift is prevented. The fixating may take place by solvent removal and/or curing such as curing involving heat and/or light such as UV light. The solvent removal may involve drying. Thus, the fixating of the method described herein may convert the viscous material into a solid material.

The gas separation article described herein may be substantially planar. The matrix part of the membrane may have a thickness from about 0.1 micrometer to about 300 micrometers. Additionally, the support may have a thickness from about 25 to about 500 micrometers.

There is also provided a gas separation article obtained or obtainable by the method described herein. For instance, there is provided a gas separation article obtained or obtainable by the method described herein, wherein the particle groups in a plurality of substantially parallel planes are aligned substantially parallel with a plane in which the support extends. In a further example, there is provided a gas separation article obtained or obtainable by the method described herein, wherein the particle groups in a plurality of substantially parallel planes are aligned substantially perpendicular with a plane in which the support extends There is also provided a use of a gas separation article as described herein, such as a gas separation membrane, for separation of gases in a gas mixture. The gas separation article may for example be used for hydrogen recovery and/or purification, production of oxygen-enriched air, $N_2$ production, natural gas sweetening, carbon capture, gas dehydration (humidity control), or vapor recovery (VOC removal). The gas mixture may comprise one or more of the following:

oxygen and nitrogen,
carbon dioxide and methane,
carbon dioxide and natural gas,
carbon dioxide and nitrogen,
hydrogen sulfide and methane;
hydrogen sulfide and natural gas,
hydrogen sulfide and biogas,
helium and nitrogen,
helium and methane,
helium and hydrogen,
hydrogen and carbon dioxide,
helium and carbon dioxide,
nitrogen and methane,
hydrogen and nitrogen,
hydrogen and methane,
hydrogen and carbon monoxide,
propene and nitrogen,
ethylene and nitrogen,
ethylene and argon,
vapor and natural gas.

In a further example, the gas mixture may comprise one or more of the following:

oxygen and nitrogen,
carbon dioxide and methane,
carbon dioxide and natural gas
carbon dioxide and biogas
carbon dioxide and nitrogen
hydrogen sulfide and methane,
hydrogen sulfide and natural gas
hydrogen sulfide and biogas,
helium and nitrogen,
hydrogen and methane,
helium and methane,
helium and hydrogen, hydrogen and carbon dioxide,
helium and carbon dioxide,
nitrogen and methane,
hydrogen and nitrogen,
hydrogen and carbon monoxide.
propene and nitrogen,
ethylene and nitrogen,
ethylene and argon,
vapor and natural gas.

In still a further example, the gas mixture may comprise one or more of the following:
oxygen and nitrogen,
carbon dioxide and natural gas,
carbon dioxide and biogas,
carbon dioxide and nitrogen,
hydrogen and methane,
helium and methane.

The gas mixture may also contain water vapor.

DETAILED DESCRIPTION OF EMBODIMENTS

Figure 1:
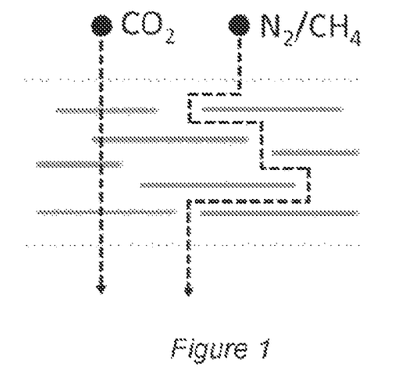
FIG. 1 shows a cross section of a gas separation membrane comprising a plurality of particle groups that are parallel to a plane in which the support extends.

FIG. 1 shows a cross section of a gas separation membrane comprising a plurality of particle groups that are parallel to a plane into which a support extended. Depending on the choice of the solidified viscous material and the particles of the plurality of particle groups some gases will be able to pass through the plurality of particle groups while others will not. As a result, gases in a gas mixture may pass through the gas separation membrane at different speeds resulting in separation of the gases. FIG. 1 shows an example where carbon dioxide ($CO_2$) is able to pass through the plurality of particle groups while nitrogen ($N_2$) and methane ($CH_4$) can only pass though the solidified membrane material.

Figure 2:
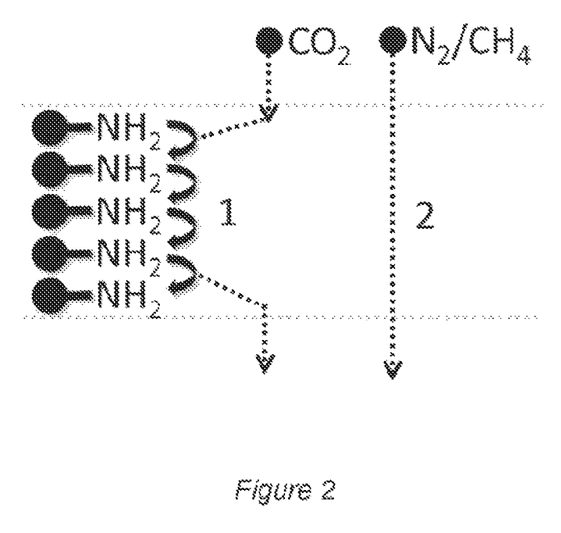
FIG. 2 shows a cross section of a gas separation membrane comprising a plurality of particle groups that are perpendicular to a plane in which the support extends.

FIG. 2 shows a cross section of a gas separation membrane comprising a plurality of particle groups (only one particle group is shown) that are perpendicular to a plane into which a support extended. In this example, the plurality of particle groups comprise an amine functionality ($NH_2$) that interacts reversibly with the carbon dioxide 1 ($CO_2$) to increase the speed with which it passes through the solidified viscous material. Such an interaction is absent for the mixture 2 of nitrogen ($N_2$) and methane ($CH_4$) which pass through the solidified membrane material more slowly than the carbon dioxide.

Figure 3:
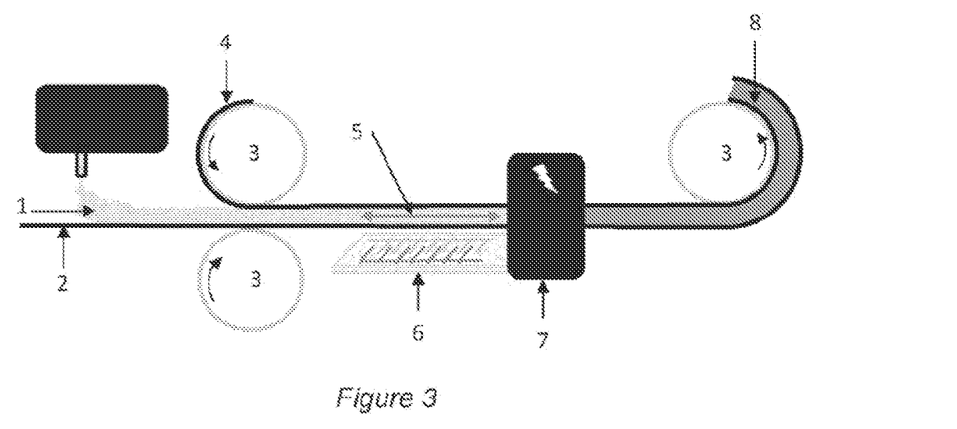
FIG. 3 shows a process for producing a gas separation article comprising use of an interdigitated electrode.

FIG. 3 shows a process for producing a gas separation article comprising use of an interdigitated electrode. The interdigitated electrode is placed below the support and generates an electric field that arranges the particles into a plurality of particle groups that are parallel to the plane in which the support extends. The use of an additional support is also illustrated. The arrow shows the direction of the electric field. In FIG. 3, the numbers designate the following: 1 is matrix, 2 is support, 3 is roll, 4 is additional support, 5 is direction of the electric field, 6 is electrode, 7 is curing chamber, 8 is solidified matrix.

Figure 4:
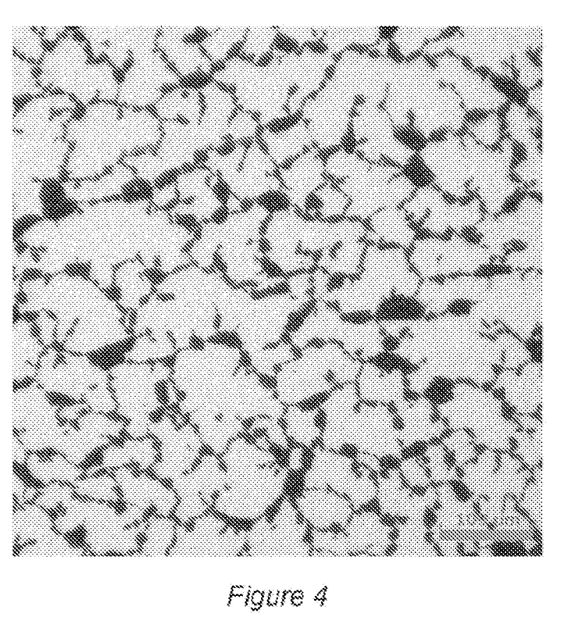
FIG. 4 shows a top view microscope image of a gas separation article produced using an interdigitated electrode.

FIG. 4 shows a top view microscope image of a gas separation article produced using an interdigitated electrode. In this case, the particles are graphite particles and the membrane thickness is about 200 micrometers.

Figure 5:
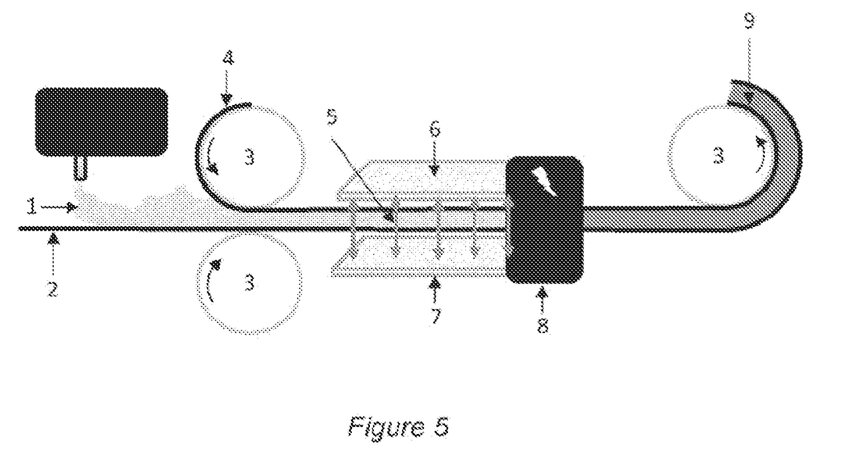
FIG. 5 shows a process for producing a gas separation article comprising use of a top electrode and a bottom electrode.

FIG. 5 shows a process for producing a gas separation article comprising use of a top electrode and a bottom electrode. The electrodes generate an electric field that arranges the particles into a plurality of particle groups that are perpendicular to the plane in which the support extends. The arrow shows the direction of the electric field. In FIG. 5, the numbers designate the following: 1 is matrix, 2 is support, 3 is roll, 4 is additional support, 5 is direction of the electric field, 6 is top electrode, 7 is bottom electrode, 8 is curing chamber, 9 is solidified matrix.

Figure 6:
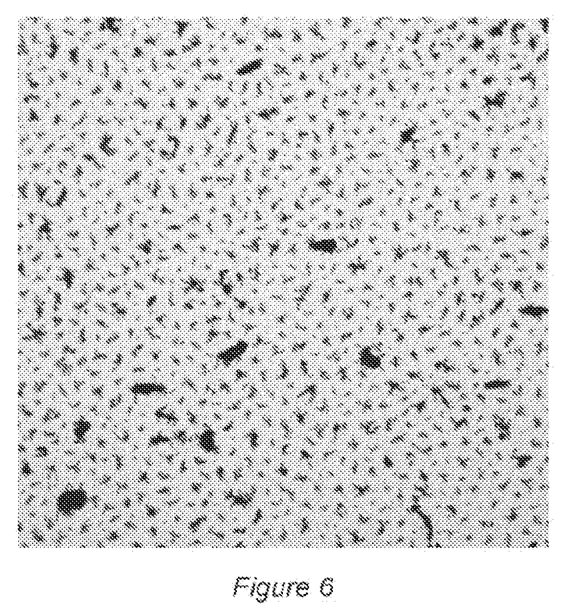
FIG. 6 shows a top view microscope image of a gas separation article produced using a top electrode and a bottom electrode.

FIG. 6 shows a top view microscope image of a gas separation article produced using a top electrode and a bottom electrode. In this case, the particles are graphite particles.

Figure 7:
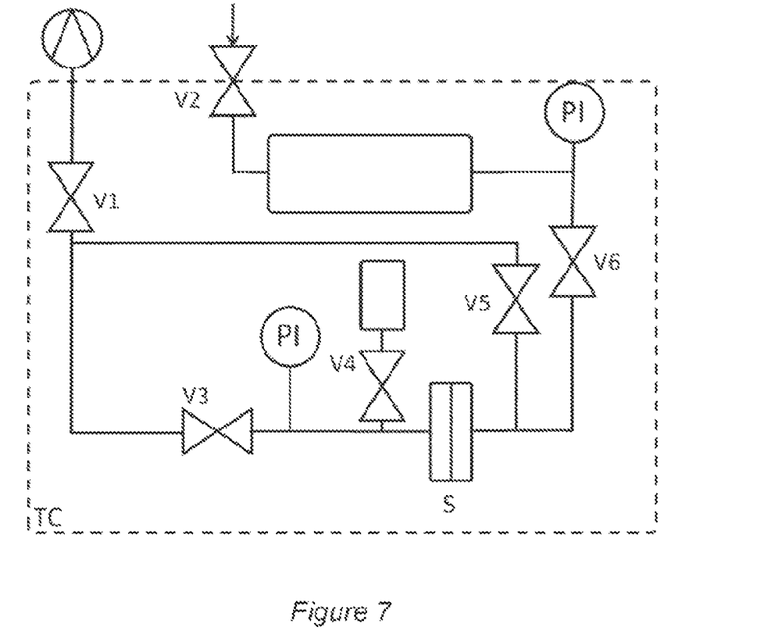
FIG. 7 shows a gas permeation setup.

FIG. 7 shows a gas permeation setup. V stands for valve, and PI stands for pressure indicator. The components within the dashed lines are contained within a thermostatic chamber denominated TC. The sample holder may be denominated S. The gas supply may be denominated GS. The vacuum may be denominated VAC.

Figure 8:
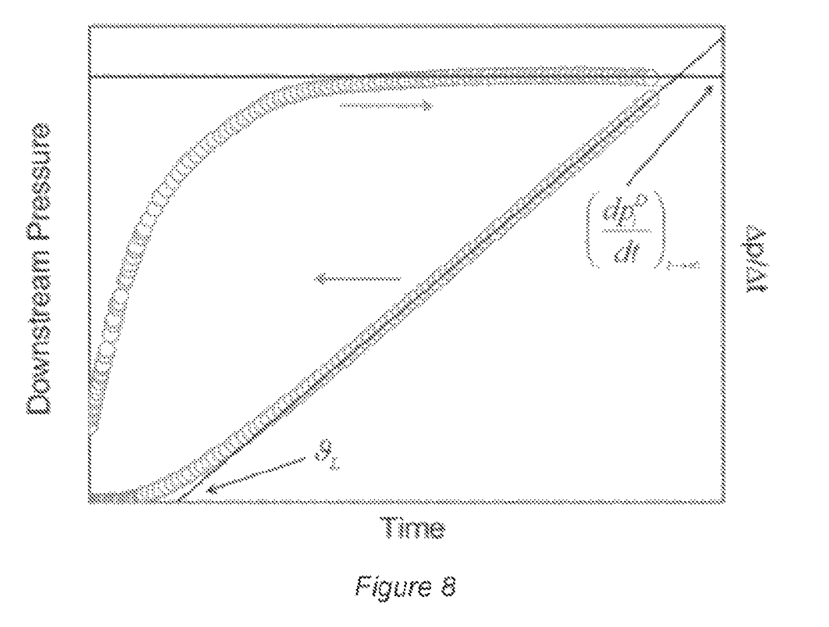
FIG. 8 shows trends in a gas permeation test.

FIG. 8 shows trends in a gas permeation test.

Figure 9:
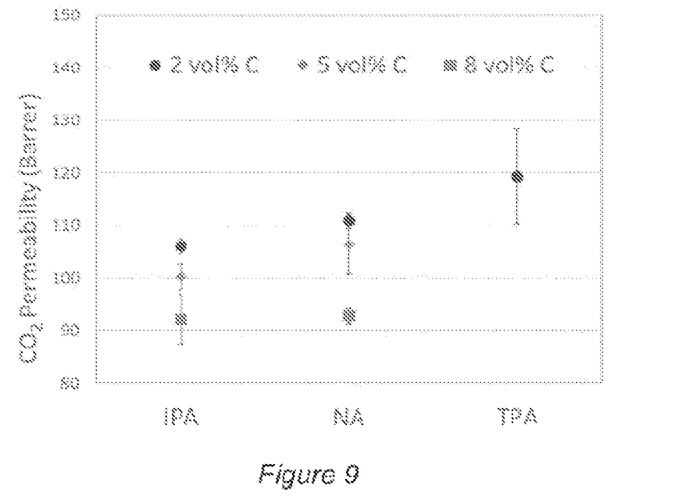
FIG. 9 shows the $CO_2$ permeability of film with three different concentrations of particles.

FIG. 9 shows the $CO_2$ permeability of three different films as described in the Examples section of this document. For the film comprising in plane aligned (IPA) graphite particles three particle concentrations were tested, namely 2 vol %, 5 vol %, and 8 vol %. For the film comprising graphite particles that had not been aligned (NA) three particle concentrations were tested, namely 2 vol %, 5 vol %, and 8 vol %. For the film comprising through plane aligned (TPA) graphite particles a single concentration of graphite particles was tested, namely 2 vol %. It was observed that the film comprising through plane aligned (TPA) graphite particle groups in a concentration of 2 vol % had a higher $CO_2$ permeability than the film comprising graphite particles that had not been aligned as well as a film comprising in plane aligned (IPA) graphite particle groups in a concentration of 2 vol %. This shows that the permeability is affected by the way the groups of particles are aligned in the matrix. In particular, this shows that through plane aligned particle groups enhance permeability such as $CO_2$ permeability while in plane aligned particle groups slow down permeability such as $CO_2$ permeability.

The disclosure is further illustrated by the following non-limitative Examples.

EXAMPLES

Abbreviations

AC Alternating Current
kHz kilo Hertz kPa kilo Pascal
kV kilo Volt
rpm revolutions per minute
vol % volume
wt % weight %

Gas Permeability Vs Graphite Concentration

A viscous polymer matrix was prepared by mixing Shikoh UT6297 (i.e. urethane acrylate purchased from Nippon Gohsei and preheated to 60° C.) together with 4 wt % of Irgacure 1173 (i.e. a UV curing agent purchased from BASF) at 2000 rpm for 120 seconds in a Thinky planetary mixer. Particles were dispersed in the polymer in two steps with the same planetary mixer. The first step was mixing at 2000 rpm for 2 minutes at ambient pressure, the next step was 2000 rpm for 4 minutes at 0.2 kPa. Three different mixes of polymer matrix and graphite particles TS0141 P (Purchased from Asbury carbon) were prepared and were made into membranes separately. The graphite particles had an average diameter of 29.7 micrometer, and standard deviation 15.3 micrometer, and a d50 value with respect to volume that was 30.13. The concentration of particles was 2 vol %, 5 vol % and 8 vol % based on the total volume of the sample.

The mixtures of polymer and particles was knife coated to a film of thickness 200 µm on a PET support. An additional PET support was used on the opposite side, creating a sandwich of PET, viscous material and PET. The particles in the viscous material was then aligned either through plane (TPA) (FIG. 6), in-plane (IPA) (FIG. 7) or not at all (NA). As used herein, TPA alignment of particles intends alignment of the particle groups to be substantially perpendicular to a plane into which the support(s) extend(s). Further, IPA alignments intends alignment of the particle groups thereof to be substantially parallel to a plane into which the support(s) extend(s). The determination of whether the alignment was in plane or through plane was made by selecting the electrode setup used to do the alignment and verified by inspecting the particles' orientation using an optical microscope. The alignment was performed with an AC electric voltage of 1-250 kHz and 0.1 kV-1 kV. After the particle alignment, the viscous material was fixated by curing the polymer with ultraviolet light. The two PET supports were then removed from the fixated viscous creating a free-standing film that was tested in the permeability setup described below.

Gas Permeation Tests:

Gas permeation measurements were performed using a constant volume variable pressure setup, where the permeability measurement was performed by measuring the variation of pressure in the permeate compartment. The film was initially evacuated overnight to ensure the complete removal of penetrants within the film. A vacuum test was then performed to measure the leak rate. Subsequently, the upstream side is pressurized to a certain pressure (~2 bar) while the pressure was monitored on the downstream side. The pressure in the downstream side increased slowly in the beginning and then reaches steady state conditions (represented by a constant derivative term). When this is reached, the permeability ($P_i$) was calculated as:

$$P_i = \left(\frac{dp_d}{dt}\bigg|_{test} - \frac{dp_d}{dt}\bigg|_{leak}\right) \cdot \frac{V_d}{RTA} \cdot \frac{\ell}{(p_u - p_d)} \text{ where } \frac{dp_d}{dt} \quad (1)$$

is the derivative term of the variation in the downstream pressure, $V_d$ is the calibrated downstream volume, R is the gas constant, T is the operating temperature, A is the permeating area, l is the membrane thickness and $p_u - p_d$ is the driving force, expressed as the difference between the upstream and downstream pressure. From the transient phase it is also possible to calculate the diffusion coefficient ($D_i$) according to the time-lag ($\vartheta_L$) observed in the experiment, as:

$$D_i = \frac{\ell^2}{\vartheta_L} \quad (2)$$

Finally, according to the solution diffusion mechanism, where the permeability can be calculated as product of the diffusion and the solubility coefficients, the latter can be estimated for the given experimental conditions.

Starting from the permeability, the ideal gas selectivity can also be calculated as ratio of the permeability coefficient (also called "perm-selectivity"). This parameter gives a good estimation of the separation performance of the membrane, although deviations may be found for real gaseous mixtures.

The gas tested was pure $CO_2$, i.e. carbon dioxide.

Gas Permeation Results:

FIG. 9 shows the measured $CO_2$ permeability for the samples described above. The gas permeability is clearly affected both by the electric field alignment of particles and the concentration of particles. Comparing the not aligned (NA) samples with the two others, shows that through plane alignment (TPA) increased the permeability, whereas in plane alignment (IPA) decreased it. This is because in the IPA-sample the electric field aligns and orients the two-dimensional graphite particles and groups thereof parallel to the plane into which the PET support(s) extended, creating a barrier for the $CO_2$ molecules. In the TPA sample the particles and groups thereof were aligned and oriented perpendicular to the plane into which the PET supports extended, which is an orientation that blocks the gas to the lowest degree.

The invention claimed is:

1. A method for producing a gas separation article, said gas separation article comprising:
    a gas separation membrane,
    a support,
    said method comprising the steps of:
    a) providing a matrix comprising:
        a matrix material having a viscosity from 1 cP to 40000 cP,
        particles, said particles being free from functionalized carbon nanotubes,
    b) contacting the matrix of step a) with a support comprising at least one side, said at least one side facing said matrix, thereby forming (i) a matrix side in contact with the support and (ii) a matrix side opposite the side in contact with the support,
    c) subjecting said matrix being in contact with said support to one or more electric fields whereby the particles form particle groups in a plurality of substantially parallel planes, said particle groups in each of said plurality of substantially parallel planes being aligned substantially parallel with the one or more electric fields,
    d) fixating the matrix material so as to fixate the particle groups thereby forming a gas separation membrane.

2. The method according to claim 1, wherein the particles are free from carbon nanotubes.

3. The method according to claim 1, wherein the particles are free from pores.

4. The method according to claim 1, wherein the particles comprise pores.

5. The method according to claim 1, wherein the particles comprise particles selected from the group consisting of graphene, graphene oxide, graphene oxide functionalized with amine group(s), metal-organic framework, zeolitic imidazolate framework, covalent organic framework, clay, silica, organic framework, and nickel oxide nanosheets.

6. The method according to claim 4, wherein the pore anisotropy is equal to or less than 100:1, said pore anisotropy being the ratio of the longest dimension to the shortest dimension of the pore.

7. The method according to claim 1, wherein the particles are electrically conductive particles.

8. The method according to claim 1, wherein the particles are electrically non-conductive particles.

9. The method according to claim 1, wherein the particles of the particle groups are aligned substantially parallel with the one or more electric fields.

10. The method according to claim 1, wherein the one or more electric fields is/are alternating electric field(s).

11. The method according to claim 1, wherein the one or more electric fields is/are substantially parallel to a plane in which the support extends.

12. The method according to claim 1, wherein the one or more electric fields is/are provided parallel to a plane in which the support extends
    and only to a first side of the support, said first side of the support being opposite the side of the support facing the matrix.

13. The method according to claim 1, wherein the one or more electric fields is/are provided by an interdigitated electrode.

14. The method according to claim 1, wherein the one or more electric fields is/are substantially perpendicular to a plane in which the support extends.

15. The method according to claim 1, wherein the particle groups are surrounded by the matrix material.

16. The method according to claim 1, wherein the support is porous.

17. The method according to claim 1, wherein the support is non-porous.

18. The method according to claim 1, wherein the gas-separation article comprises an additional support.

19. The method according to claim 1, wherein the matrix material comprises one or more of the following: monomer(s), oligomer(s), polymer(s).

20. The method according to claim 1, wherein the matrix material comprises one or more polymers selected from the group consisting of polyurethane, polyether block amide, polyimide, polydimethylsiloxane, polyethylene glycol, ethylene acrylic elastomer, perfluoropolymers, polymerized ionic liquids, polysulfone, polyamide, polyvinylamine, polyallylamine, polyethyleneimine, cyanoacrylates, rosin acrylates, ester acrylates, urethanes acrylates, silicone acrylates, amine acrylates, epoxy acrylates and polyepoxides, polyethylene, poly (tetramethylene oxide), polyethylene oxide, polyphenylene oxide, polydioxolane.

21. The method according to claim 1, wherein the support comprises one or more of the following: polyethylene terephthalate (PET), polysiloxanes, polydimethylsiloxane (PMDS), poly(1-trimethylsilyl-1-propyne) (PTMSP), polyacrylonitrile (PAN), perfluoropolymers, perfluoroethers (PTFE), polyvinylidene fluoride (PVDF), polyether sulfones (PES), polysulfones (PSU), polyimides (PI), polyetherimides (PEI), polyamides, polyamideimides, polycarbonates (PC), polyesters, polyether ether ketone (PEEK), polye (ethylene oxide) (PPO), polyacrylates, polymethacrylates, cellulose acetate, polyethylene (PE), polypropylene (PP) polytetrafluoroethylene (PTFE), polymethylpentene (PMP), copolymers of one or more of the aforementioned polymers.

22. The method according to claim 1, wherein the fixating of step d) comprises solvent evaporation and/or curing.

23. The method according to claim 1, wherein the fixating of step d) comprises converting the matrix into a solid material.

24. A gas separation article obtainable by the method according to claim 1.

25. Use of
    a gas separation article according to claim 24
    for separation of gases in a gas mixture comprising one of more of the following:
    oxygen and nitrogen,
    carbon dioxide and methane,
    carbon dioxide and natural gas,
    carbon dioxide and biogas,
    carbon dioxide and nitrogen,
    hydrogen sulfide and methane,
    hydrogen sulfide and natural gas,
    hydrogen sulfide and biogas,
    helium and nitrogen,
    hydrogen and methane,
    helium and methane,
    helium and hydrogen,
    hydrogen and carbon dioxide,
    helium and carbon dioxide,
    nitrogen and methane,
    hydrogen and nitrogen,
    hydrogen and carbon monoxide,
    propene and nitrogen,
    ethylene and nitrogen,
    ethylene and argon,
    vapor and natural gas.

* * * * *